United States Patent [19]

Cohen et al.

[11] Patent Number: 5,822,748
[45] Date of Patent: Oct. 13, 1998

[54] GROUP BY AND DISTINCT SORT ELIMINATION USING COST-BASED OPTIMIZATION

[75] Inventors: Jeffrey Ira Cohen, Sunnyvale; Cetin Ozbutun, San Carlos; Michael Depledge, San Jose; Hakan Jakobsson, San Francisco, all of Calif.

[73] Assignee: Oracle Corporation, Redwood Shores, Calif.

[21] Appl. No.: 808,097

[22] Filed: Feb. 28, 1997

[51] Int. Cl.[6] ....................................................... G06F 17/30
[52] U.S. Cl. .......................... 707/2; 707/1; 707/3; 707/4; 707/5; 707/6; 707/7
[58] Field of Search ..................................... 1/1; 707/1, 2, 707/3, 4, 5, 6, 7; 364/705; 395/674

[56] References Cited

U.S. PATENT DOCUMENTS

| | | | |
|---|---|---|---|
| 5,301,317 | 4/1994 | Lohman | 707/2 |
| 5,666,526 | 9/1997 | Reiter | 707/2 |
| 5,668,987 | 9/1997 | Schneider | 707/2 |
| 5,671,403 | 9/1997 | Shekita | 707/3 |
| 5,680,602 | 10/1997 | Bloem | 707/1 |
| 5,734,884 | 3/1998 | Eberhard | 1/1 |

*Primary Examiner*—Thomas G. Black
*Assistant Examiner*—Diane D. Mizrahi
*Attorney, Agent, or Firm*—McDermott, Will & Emery

[57] ABSTRACT

Sort plus operations such as "group by" and "distinct" generally require sorting of the retrieved data before performing the sort plus operation. A method and apparatus is disclosed for executing a query specifying a sort plus operation without performing the sorting operation. A cost-based optimizer determines at least one execution path where the data is retrieved from a sorted source and the data is processed to satisfy the query without sorting. Execution costs are determined for the respective execution paths, and the execution path having the lowest overall execution cost is selected to process the query.

14 Claims, 7 Drawing Sheets

GROUP BY AND DISTINCT SORT ELIMINATION USING COST-BASED OPTIMIZATION

The present application is related to: Pending U.S. patent application Ser. No. 08/807,344, entitled "CREATING BITMAPS FROM MULTI-LEVEL IDENTIFIERS", filed by Cetin Ozbutun, Michael Depledge, Hakan Jakobsson, Mark Kremer, Jeffrey I. Cohen. Quoc Tai Tran, and Alexander C. Ho on the equal day herewith, the contents of which are incorporated herein by reference.

Pending U.S. patent application Ser. No. 08/808,584, entitled "BITMAP SEGMENTATION", filed by Cetin Ozbutun, Jeffrey I. Cohen, Hakan Jakobsson, Mark Kremer, Michael Depledge, Quoc Tai Tran, Alexander C. Ho, and Julian Hyde, on the equal day herewith, the contents of which are incorporated herein by reference.

Pending U.S. patent application Ser. No. 08/752,128, entitled "METHOD AND APPARATUS FOR PROCESSING COUNT STATEMENTS IN A DATABASE SYSTEM", filed by Cetin Ozbutun, Michael Depledge, Hakan. Jakobsson, and Jeffrey I. Cohen, on Nov. 20, 1996, the contents of which are incorporated herein by reference.

Pending U.S. patent application Ser. No. 08/808,097, entitled "GROUP BY AND DISTINCT SORT ELIMINATION USING COST-BASED OPTIMIZATION", filed by Jeffrey Ira Cohen, Cetin Ozbutun, Michael Depledge, and Hakan Jakobsson, on the equal day herewith, the contents of which are incorporated herein by reference.

Pending U.S. patent application Ser. No. 08/808,096, entitled "METHOD AND APPARATUS FOR USING INCOMPATIBLE TYPES OF INDEXES TO PROCESS A SINGLE QUERY", filed by Jeffrey Ira Cohen, Cetin Ozbutun, Hakan Jakobsson, and Michael Depledge, on the equal day herewith, the contents of which are incorporated herein by reference.

Pending U.S. patent application Ser. No. 08/808,094, entitled "INDEX SELECTION FOR AN INDEX ACCESS PATH", filed by Hakan Jakobsson, Michael Depledge, Cetin Ozbutun, and Jeffrey I. Cohen, on the equal day herewith, the contents of which are incorporated herein by reference.

Pending U.S. patent application Ser. No. 08/807,429, entitled "QUERY PROCESSING USING COMPRESSED BITMAPS", filed by Cetin Ozbutun, Jeffrey I. Cohen, Michael Depledge, Julian Hyde, Hakan Jakobsson, Mark Kremer, and Quoc Tai Tran, on the equal day herewith, the contents of which are incorporated herein by reference.

Pending U.S. patent application Ser. No. 08/807,451, entitled "BITMAPPED INDEXING WITH HIGH GRANULARITY LOCKING", filed by Michael Depledge, Jeffrey I. Cohen, Hakan Jakobsson, Mark Kremer, Cetin Ozbutun, Quoc Tai Tran and Alexander C. Ho, on the equal day herewith, the contents of which are incorporated herein by reference.

Pending U.S. patent application Ser. No. 08/809,585, entitled "UPDATING BITMAPPED INDEXES", filed by Michael Depledge, Hakan Jakobsson, Cetin Ozbutun, Jeffrey I. Cohen, and Quoc Tai Tran, on the equal day herewith, the contents of which are incorporated herein by reference.

Pending U.S. patent application Ser. No. 08/808,560, entitled "BITMAP INDEX COMPRESSION", filed by Jeffrey I. Cohen, Michael Depledge, Hakan Jakobsson, Mark Kremer, Cetin Ozbutun, and Quoc Tai Tran, on the equal day herewith, the contents of which are incorporated herein by reference.

Pending U.S. patent application Ser. No. 08/808,586, entitled "COMBINING BITMAPS WITHIN A MEMORY LIMIT", filed by Cetin Ozbutun, Jeffrey I. Cohen, Michael Depledge, Julian Hyde, Hakan Jakobsson, Mark Kremer, and Quoc Tai Tran, on the equal day herewith, the contents of which are incorporated herein by reference.

FIELD OF THE INVENTION

This invention relates to database systems, more specifically to techniques for processing queries within a database system.

BACKGROUND OF THE INVENTION

Relational database management systems store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries.

A user retrieves information from and updates a database by interacting with a database application. The user's actions are converted to a query by the database application. The database application submits the query to a database server. The database server responds to the query by accessing the tables specified in the query to determine which information stored in the tables satisfies the queries. The information that satisfies the queries is retrieved by the database server and transmitted to the database application.

Various access methods may be used to retrieve data from a database. For example, the database server may perform a table scan, where the database server reads every row of the table and evaluates column values against the selection criterion specified by a query to determine which rows satisfy the selection criterion. Alternatively, the database server may use one or more indexes to improve the speed of the data retrieval process. Indexes are data structures that provide relatively fast access to a set of data based on key values.

The key values of the entries within some types of indexes have a specified ordering. For example, within the leaf nodes of a B-tree index, index entries are typically stored in the alphabetical order of the key values contained within the index entries. Further, the leaf nodes themselves may be linked to form a chain such that the key values of the index entries are ascending from left to right in the leaf node chain.

Queries submitted to the database server must conform to the rules of a particular query language. One popular query language, known as the Structured Query Language (SQL), provides users a variety of ways to specify information to be retrieved. One function available in SQL is "ordered by". When a query has an order by clause, the database server sorts the data specified in the query based on the key specified in the order by clause.

In some instances, the ordering of keys within an index may be used to avoid the need to perform the sorting operations that would otherwise be required by "order by" clauses. Specifically, if a B-tree index is built on the key that is specified in an "order by" clause of a query, then key values may be retrieved, in order, from the index entries of the B-tree index. Since the index entries within the B-tree index are alphabetically ordered, the retrieved key values will be in alphabetical order and no additional sorting will be required.

Another SQL function is "group by". The group by clause causes the data specified in a query to be divided into different groups such that all rows in a given group have the same value for the key specified in the "group by" clause. Hence, the SQL query "select state, avg(sales) from customer group by state" causes the database server to arrange the average sales into groups, where all rows in any given group have the same value for the key "state."

Another SQL function is "distinct". The distinct clause causes the elimination of redundant values in the specified set of data. For example, the SQL query "select distinct deptno from emp" returns the set of unique departments "deptno" from the table "emp." Even if a particular department number appears in fifty rows of the table "emp", it will only appear once in the result set of the query.

In conventional database systems, SQL operations such as "group by" and "distinct" are executed without regard to whether the data specified in the query will be read from a sorted source, such as a B-tree index, or an unsorted source, such as a table. However, it has been discovered that efficiency of "group by" and "distinct" operations may often be significantly improved if key values are available from a sorted source. Based on the foregoing, it is clearly desirable to provide a mechanism for improving the efficiency of "group by" and "distinct" sort operations by taking into account the existence of sorted sources when determining how to best execute a query that contains a "group by" or "distinct" clause.

SUMMARY OF THE INVENTION

A method and apparatus for executing a query that specifies a sort plus operation determines at least two execution paths and their respective costs, where at least one of the paths would require obtaining data from a sorted source and executing a version of the sort plus operation that does not perform sorting. Execution costs are determined for the respective execution paths, and one of the execution paths is selected based on a comparison of the respective execution costs. The selected execution path is then executed to process the query.

According to the present invention, the determination of an execution path that executes a version of the sort plus operation without sorting enables the option of executing a query by obtaining data specified in the query from a sorted source, where sorting is not necessary. Hence, a cost-based optimizer may determine that a query can be more efficiently executed without use of sorting by accessing data from a sorted source, for example an index, as opposed to performing a relatively simple table scan followed by a complex sort.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for executing a query that specifies a sort plus operation is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

Hardware Overview

Figure 1:
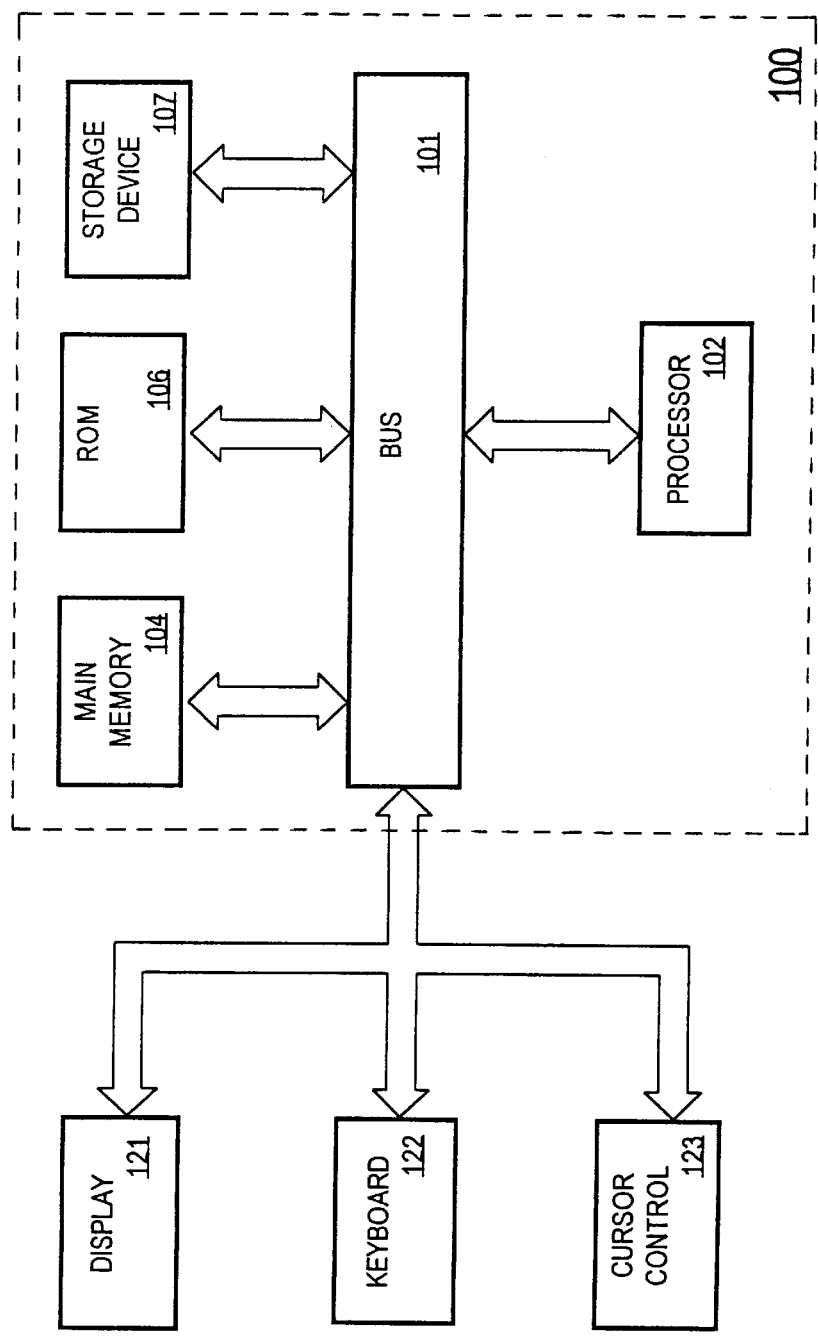
FIG. 1 is a block diagram of a computer system that may be used to implement an embodiment of the invention.

FIG. 1 is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

The present invention is related to the use of computer system 100 to process queries. According to one embodiment, queries are processed by computer system 100 in response to processor 102 executing sequences of instructions contained in memory 104. Such instructions may be read into memory 104 from another computer-readable medium, such as data storage device. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

Sort Plus Operations

Figure 6:
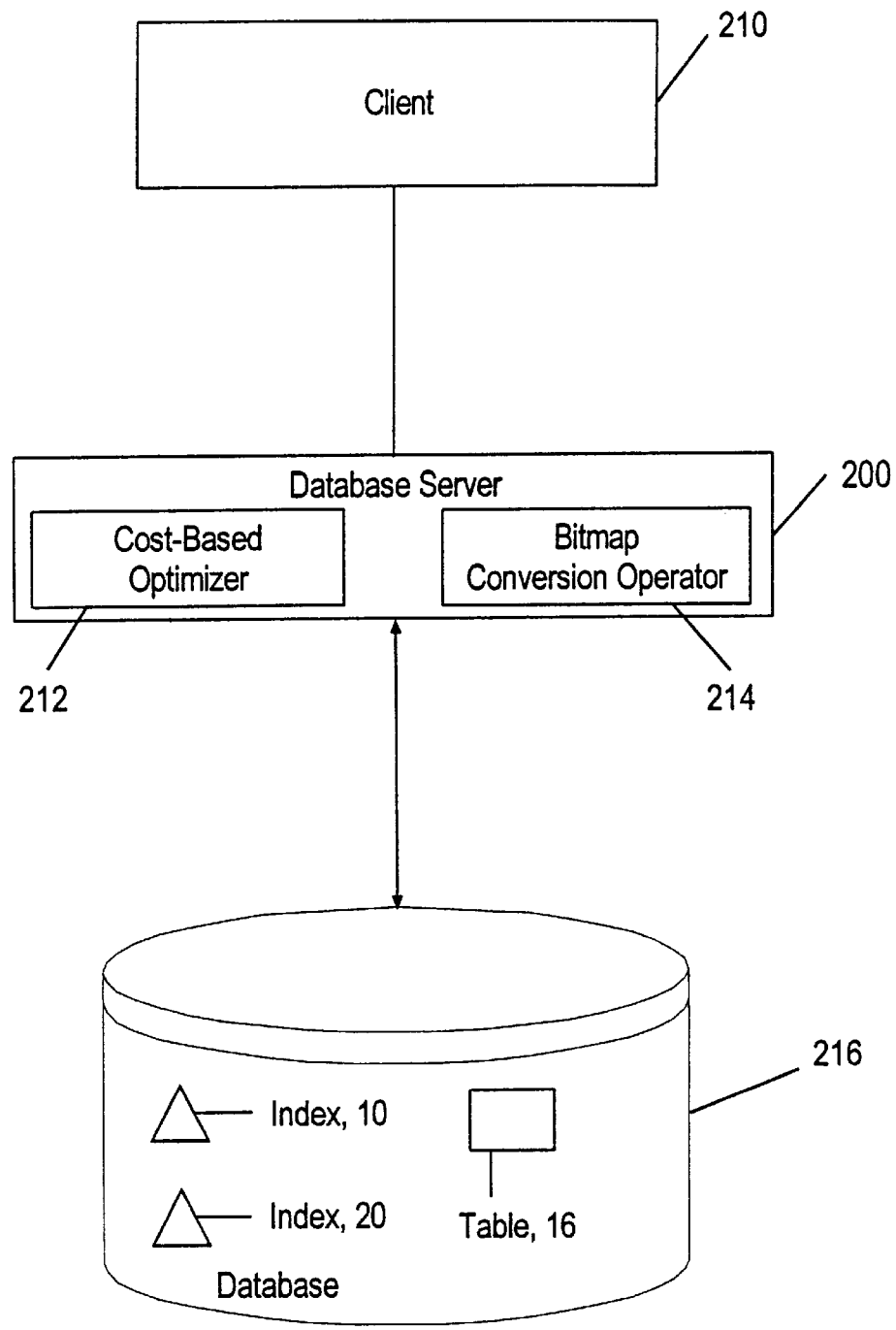
FIG. 6 is a diagram illustrating a structure of a database server according to an embodiment of the present invention.

"Sort plus" operations are database operations executed by a database server that includes sorting as a substep. FIG. 6 is a diagram illustrating a database server 200, which may be implemented as a computer application program having sequences of instructions stored in the memory 104 and executed in the processor 102 of FIG. 1. The sorting substep executed by the database server 200 in a sort plus operation provides an ordering as specified by the database query. Hence, information satisfying the database query is retrieved from a data source and sorted into a specified order before performing subsequent operations, regardless of whether the retrieved information is obtained from a table scan or from an index.

Figure 2:
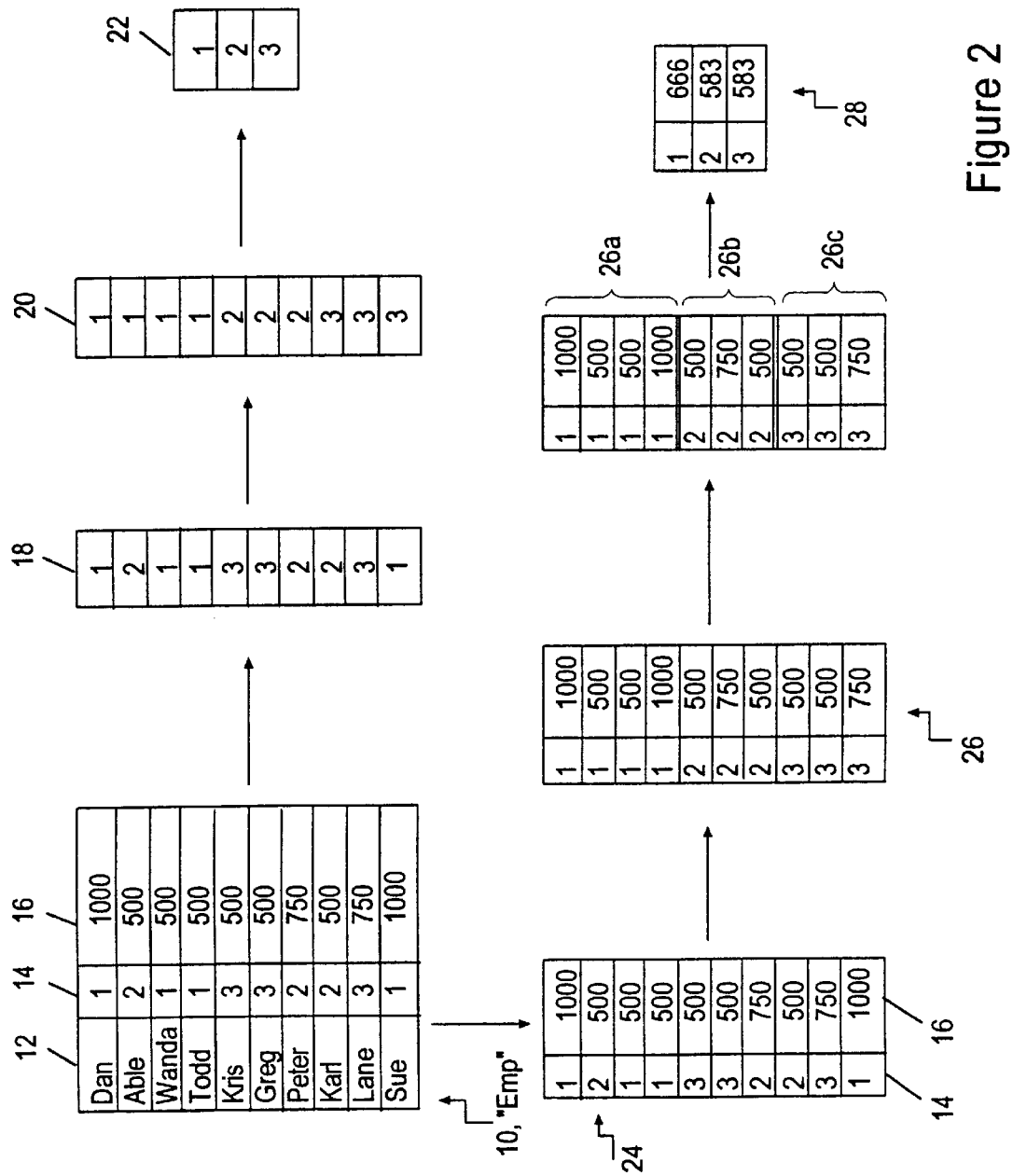
FIG. 2 is a diagram illustrating sort plus operations using sorting as a substep.

FIG. 2 is a diagram illustrating a method of executing a query the requires a sort plus operation, i.e., an operation in which sorting is a substep. As shown in FIG. 2, an employee ("emp") table 10 includes a name column 12, a department number ("deptno") column 14, and a salary ("sal") column 16. The table 10 is stored in the storage device 107 of the apparatus of FIG. 1, although the table 10 may also be temporarily stored in the main memory 104. As shown in FIG. 2, the table is an unsorted source, where the data is not sorted by the name column 12, the "deptno" column 14, or the sal column 16. Hence, a sort plus operation typically performs sorting to arrange the retrieved data into an ordering as specified by a database query in order to complete execution of the query.

One sort plus operation that uses sorting is "distinct." For example, the database server 200 would begin execution of the SQL query "select distinct deptno from emp" by performing a table scan, i.e., accessing the table "emp" 10, and reading all of the rows of the table 10 to obtain the values for the "deptno" column 14. The table scan of the table "emp" 10 would return the values of the "deptno" column 14, illustrated in FIG. 2 by reference numeral 18. The database server would next perform sorting on the retrieved data 18, resulting in the sorted data 20. After obtaining the sorted data 20, the database server would remove duplicates from the sorted data 20 to obtain the result 22 specified in the query.

FIG. 2 also illustrates execution of another sort plus operation, namely the "group by" function. For example, the database server 200 would execute the SQL query "select avg(sal) from emp group by deptno" by performing a table scan on the table "emp" 10 to retrieve the data from the "deptno" column 14 and the "sal" column 16, shown as reference numeral 24. The sort plus "group by" operation is then executed by first sorting the retrieved data 24 based on the argument "deptno," resulting in the sorted data table 26. Once the data has been sorted by "deptno," the database server 200 executes the "group by" operation on the sorted data table 26 to form the respective groupings 26a, 26b and 26c based upon the value of "deptno." The function "avg (sal)" can then be executed on the groups 26a, 26b, and 26c to obtain the result 28 for the query "select avg(sal) from emp group by deptno."

As shown in FIG. 2, both the "distinct" and "group by" operations involve sorting as a substep in order to arrange the data in a prescribed order. Hence, these "sort plus" operations involve a sort operation, plus subsequent specific steps to be performed on the sorted data. In some instances, the sorting operation may involve a substantial amount of processing overhead.

Sortless Sort Plus Operations

According to the present invention, sortless "sort plus" operations are provided as an alternative execution path for a query. The alternative execution path includes obtaining data specified in the query from a sorted source, for example an index, and executing a version of the sort plus operation that does not perform sorting.

Figure 3A:
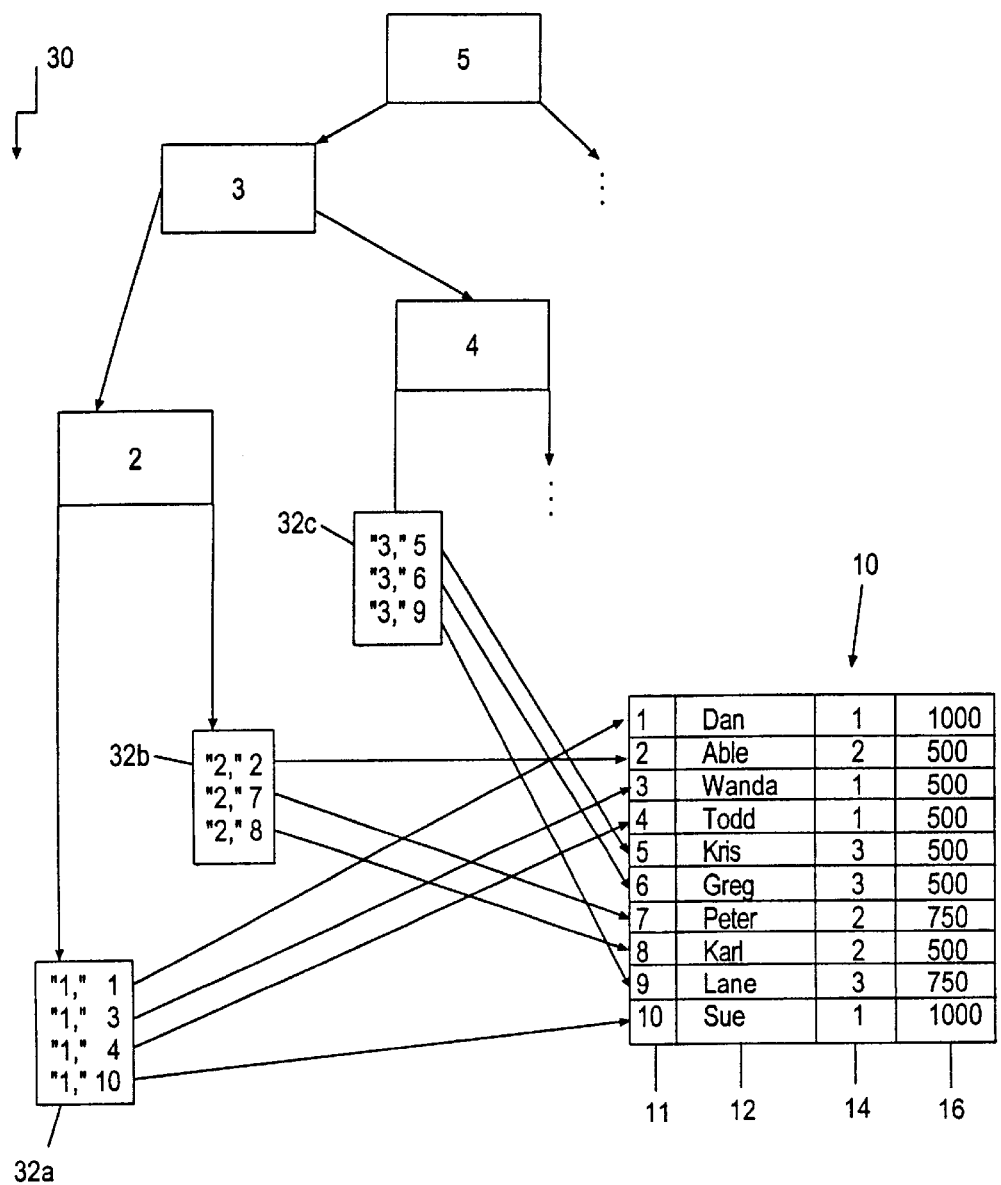
FIGS. 3A and 3B are diagrams illustrating sortless sort plus operations accessing data from a sorted source according to an embodiment of the invention.
Figure 3B:
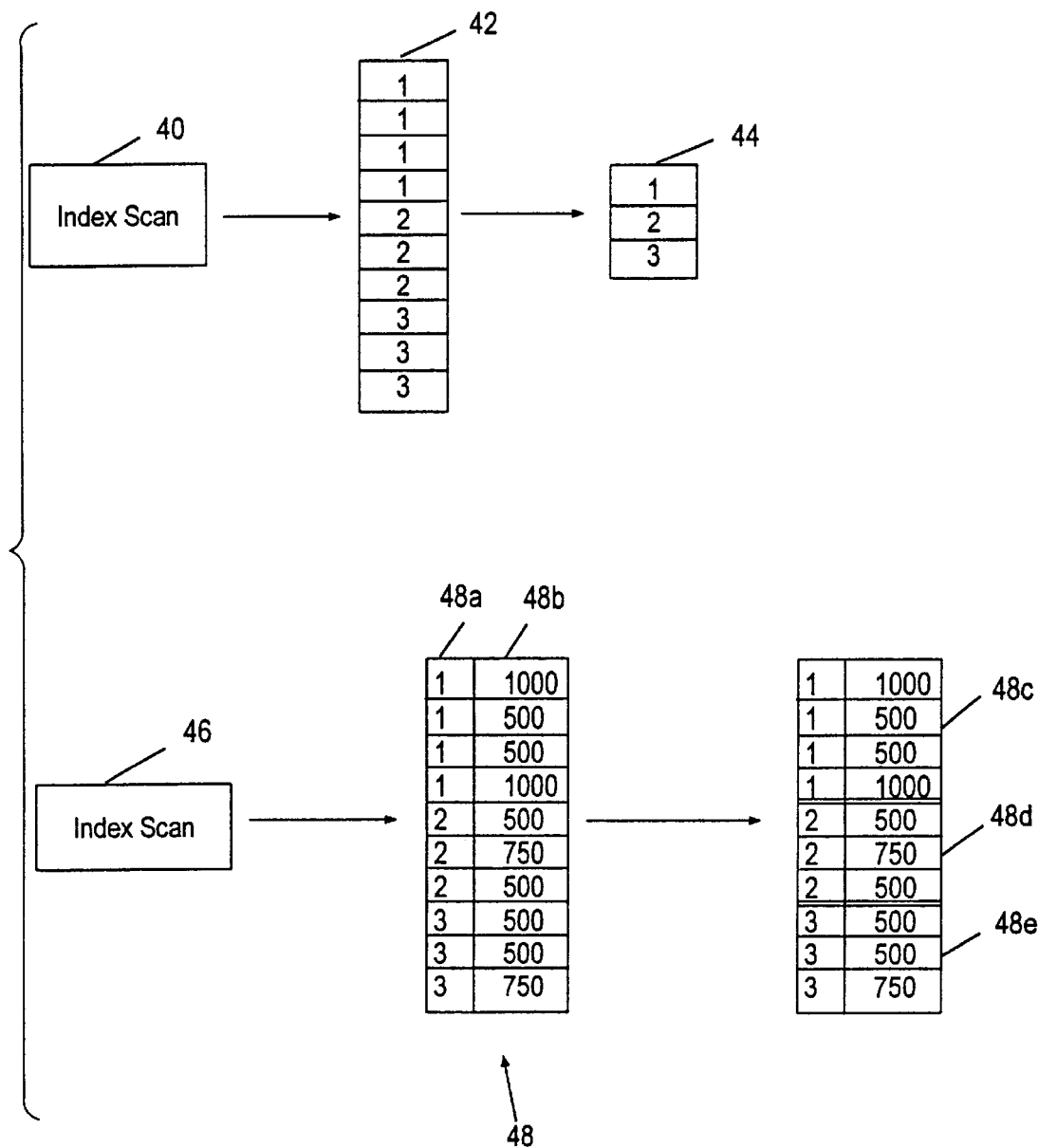

FIGS. 3A and 3B are diagrams illustrating execution of sortless "sort plus" operations by obtaining data from a sorted source. FIG. 3A discloses a B-tree index 30 of the data table 10 having an ordering based on the "deptno" column 14. The table 10 includes a rowid pseudocolumn 11, and the leaf nodes 32a, 32b, and 32c specify the rowids for table entries having a "deptno" value equal to the key values "1", "2", and "3", respectively.

Since the key value is the value for the key upon which the B-tree was built, the key values of the leaf nodes 32 provide a sorted source for processing database queries. As described below, the availability of sorted sources enables a cost-based optimizer within the database server to determine a corresponding plurality of execution paths, where a cost-based optimizer may select an execution path having the lowest overall execution cost. The overall cost for executing a query by retrieving data from a sorted source may be lower, even though use of sorted source in the data retrieval process may have a higher associated cost. Hence, a cost-based optimizer may be able to select from a plurality of indexes having redundant orderings relative to the query.

FIG. 3B is a diagram illustrating execution of sortless "sort plus" operations according to an embodiment of the present invention. For example, the database server can execute the SQL query "select distinct deptno from emp" by obtaining data specified in the query from a sorted source in step 40, for example the index 30. As described above, the index 30 has an ordering corresponding to the argument "deptno." Use of the index in step 40 results in retrieval of the "deptno" value in an ordered arrangement, as shown by reference numeral 42. Once the key values 42 have been retrieved from the B-tree index, duplicates may be eliminated from the sorted data to obtain the query result 44. Hence, the query result 44 may be obtained without sorting.

FIG. 3B also illustrates a sortless "group by" operation, where the database server 200 executes the SQL query "select sal from emp group by deptno" by first obtaining data specified in the query from an index scan in step 46, for example from a concatenated B-tree index built in the key value "deptno" and having "sal" as a second key value. The concatenated index would include leaf node entries <deptno+sal, rowid> with an ordering based on the key value "deptno+sal." The database server obtains the key entries "deptno" and "sal" as shown in reference numeral 48, including the column value for "deptno" in column 48a and the salary value "sal" in column 48b. As shown in FIG. 3B, the retrieved data 48 is already ordered based on the "deptno" column 48a. After retrieval of the data 48, the database server executes the version of the "sort plus" operation that does not perform sorting (i.e., the "group by" function) to obtain the query result having the groups 48c, 48d, and 48e.

The use of ordered data, also referred to as "presorted" data, eliminates the necessity for sorting when the ordering of the data already matches the ordering required in processing the SQL statement. Hence, the present invention can utilize different sorted sources (e.g., indexes) to determine a plurality of execution paths in processing a query.

Using Sortless Sort Plus Operations as Alternative Query Execution Paths

Figure 4:
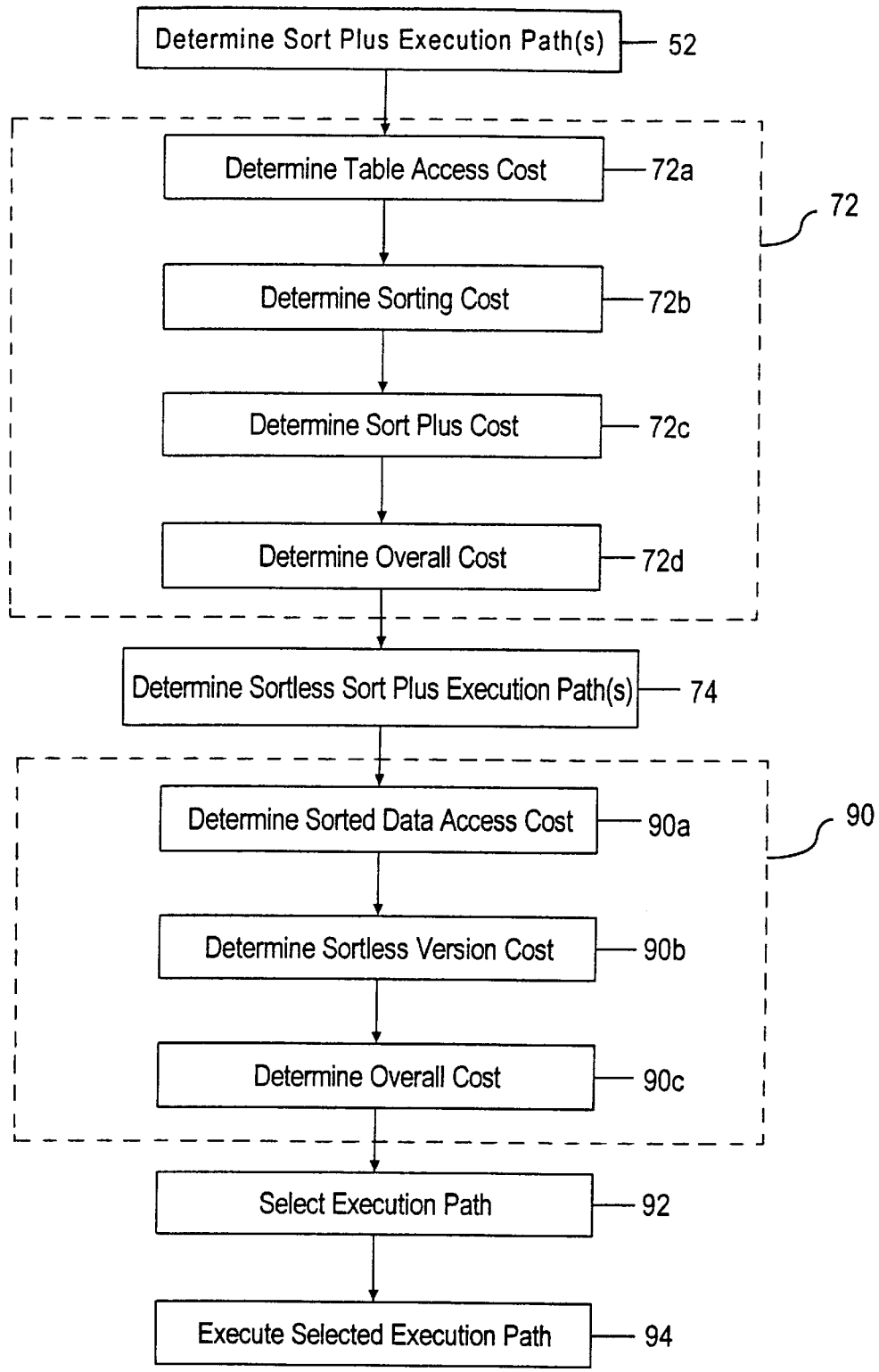
FIG. 4 is a flow diagram illustrating a method of executing a query based on determining execution paths and respective costs according to an embodiment of the invention.

As shown in FIG. 6, the database server 200 receives a query from a client application 210. The database server 200 uses a cost-based optimizer 212 to determine a plurality of available execution paths for executing the query specifying the sort plus operation. FIG. 4 is a flow diagram illustrating a method of executing a query that specifies a sort plus operation according to the disclosed embodiment. The method of FIG. 4, executed by the cost-based optimizer 212, begins by determining in step 52 at least one sort plus execution path for executing a specified query.

Figure 5:
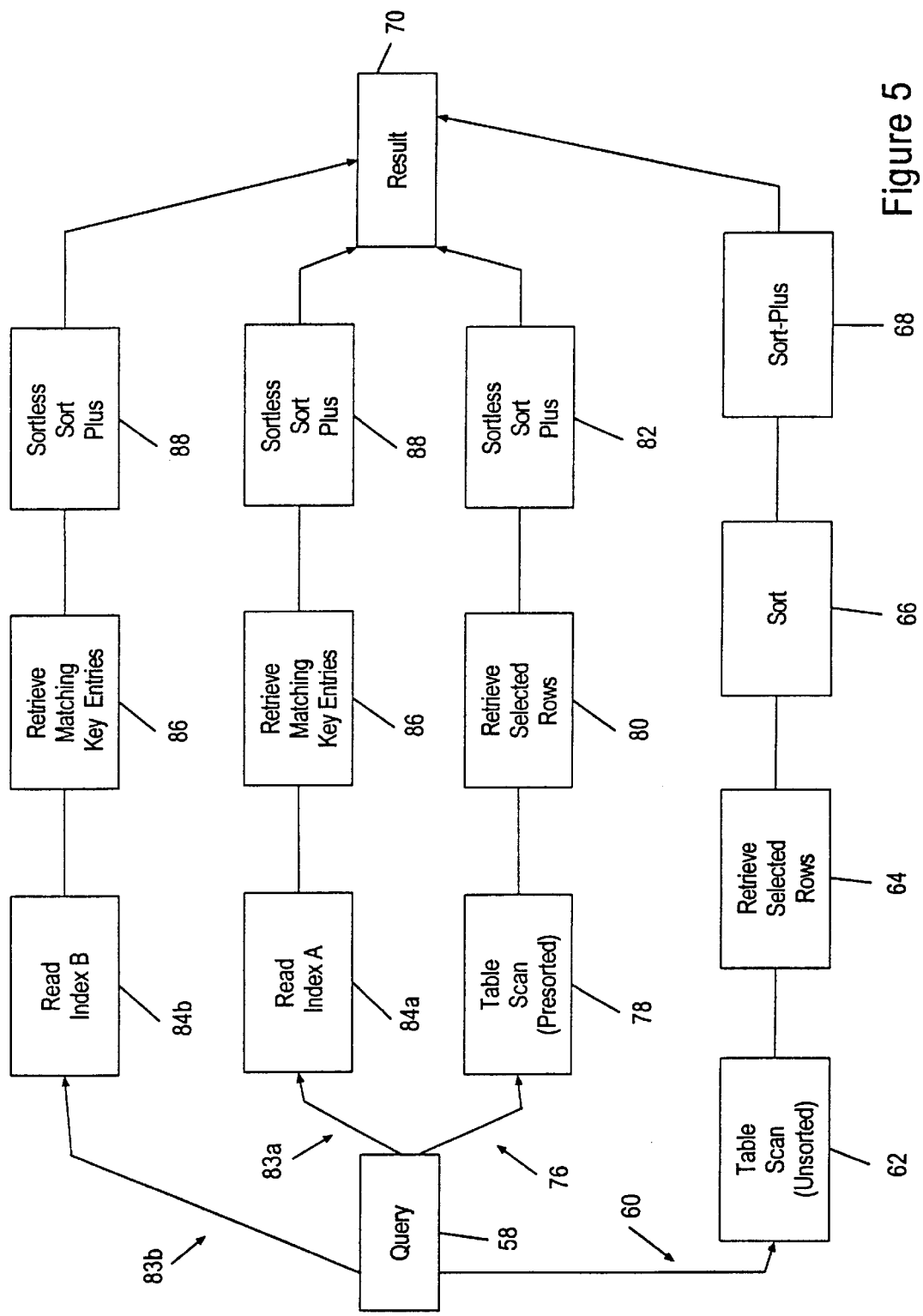
FIG. 5 is a diagram illustrating a plurality of determined execution paths for executing a specified query.

FIG. 5 is a diagram illustrating alternative execution paths for a query 58. As shown in FIG. 5, a first execution path 60 executes the query 58 by first performing in step 62 a table scan of the data table 10 having unsorted data. The table scan of unsorted data returns a set of rows matching the query selection criterion in step 64, referred to as a row source. The execution path 60 then performs sorting of the row source in order to obtain an ordered data set, for example the ordered data set 26 of FIG. 2. The execution path 60 then performs in step 68 the sort plus operation specified in the query, for example the distinct operation or the group by operation, and returns the result to the database application in step 70.

As shown in FIG. 4, the cost-based optimizer 212 determines a cost of the sort plus execution path 60 in step 72. The costs of the sort plus execution path 60 are based upon the associated costs of the table scan in steps 62 and 64 (substep 72a), the cost of sorting the row source in step 66 (substep 72b), determining the associated cost of the sort plus operation in step 68 (substep 72c), and determining the overall cost of the execution path 60 based upon the cost of the table access, the sorting cost, and the sort plus cost (substep 72d).

The cost-based optimizer 212 also determines at least one sortless sort plus execution path in step 74. FIG. 5 illustrates three alternative query execution paths using sortless sort plus operations. Execution path 76 performs a table scan of presorted data in step 78. The presorted data may be entered into a data table in a prescribed order matching the desired order of the query. Alternatively, the table having presorted data may be stored as a database object after a specific sorting 15 operation has been executed on the table. After the execution path 76 performs the table scan in step 78, the execution path 76 retrieves the selected rows matching the query selection criterion as a row source in step 80. Since the row source will generate a set of rows having the order prescribed from the presorted table scan in step 78, the execution path 76 performs the sort plus operation (i.e., distinct, group by) in step 82 without performing sorting, and returns the result in step 70.

Execution paths 83a and 83b illustrate alternative sortless execution paths that obtain data specified in the query from different indices having redundant orderings, for example the index 30 and the concatenated index described with respect to step 46 of FIG. 3B, respectively. For example, the execution path 83a reads the key values of the index entries from the B-tree index 30 in step 84a, and the execution path 83b reads the key values of the index entries from the concatenated index in step 84b. Although the indexes have redundant orderings with respect to the specified query, each index may have different costs associated with accessing the index. Hence, the cost-based optimizer evaluates the respective costs for accessing different indexes in order to obtain the lowest-cost execution path.

After reading the key values satisfying the query selection criterion from the respective indexes, the execution paths 83a and 83b each retrieve the matching key entries in step 86, and perform the specified sort plus operation without sorting in step 88. After the sort plus operation is performed in step 88, each execution path 83a and 83b returns the query result in step 70.

As shown in FIG. 4, once the optimizer determines the alternative sortless sort plus execution paths in step 74, the optimizer determines the respective costs of the sortless sort plus execution paths in step 90, including determining the access costs in step 90a, determining in step 90b the costs associated with performing the sort plus operation in steps 82 or 88, and determining the overall execution costs for each execution path based upon the respective access costs and sort plus operation costs. After the overall execution costs have been determined for each of the alternative execution paths, the cost-based optimizer selects in step 92 the execution path based on the overall cost. The selected execution path is then executed in step 94 by the server.

According to the present invention, alternative query execution paths are provided in which sorts do not need to be performed. Hence, a cost-based optimizer is able to select an execution path that avoids sorting operations on presorted data. Although the disclosed operations have been described with respect to "group by" and "distinct" operations as examples of sort plus operations, the above-described techniques apply to all sort plus operations.

In addition, various alternative execution paths may be selected based on data having various levels of sorting. For example, a plurality of indices having multidimensional ordering (e.g., concatenated indexes) may be available, where a specified query may use any one of a number of different orderings to satisfy the query.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method of executing a query that specifies a sort plus operation, the method comprising:

A. determining a first execution path, where execution of the first execution path would require performing the steps of:
  (1) obtaining data specified in the query from a sorted source, and
  (2) executing a first version of the sort plus operation that does not perform sorting;

B. determining a second execution path, where execution of the second execution path would require performing the steps of:
  (1) obtaining data specified in the query from an unsorted source, and
  (2) executing a second version of the sort plus operation that does perform sorting;

C. determining a first execution cost for the first execution path and a second execution cost for the second execution path;

D. selecting a selected execution path from among a set of execution paths that includes said first execution path and said second execution path based on a comparison of said first execution cost and said second execution cost; and E. executing said selected execution path.

2. The method of claim 1, wherein the step of obtaining data specified in the query from a sorted source includes the step of obtaining data specified in the query from a first index.

3. The method of claim 2, wherein the step of obtaining data specified in the query from an unsorted source includes the step of obtaining data specified in the query from a table.

4. The method of claim 2, wherein the step of determining a first execution cost for the first execution path comprises the steps of:

determining a first access cost corresponding to accessing the first index to obtain the data specified in the query;

determining a cost of executing the first version of the sort plus operation; and determining the first execution cost based on the first access cost and the cost of executing the first version of the sort plus operation.

5. The method of claim 4, wherein the step of determining a second execution cost for the second execution path comprises the steps of:

determining a second access cost corresponding to accessing a table to obtain data specified in the query;

determining a cost of executing the second version of the sort plus operation; and determining the second execution cost based on the second access cost and the cost of executing the second version of the sort plus operation.

6. The method of claim 1 wherein the step of determining a first execution cost for the first execution path and a second execution cost for the second execution path includes causing a cost-based optimizer to determine the first execution cost for the first execution path and the second execution cost for the second execution path.

7. The method of claim 2, further comprising determining a third execution path for the query, wherein execution of the third execution path includes the steps of:

obtaining data specified in the query from a second index, and executing the first version of the sort plus operation.

8. The method of claim 1, wherein:

the sort plus operation is a "group by" operation; and the step of executing the second version of the sort plus operation includes the steps of sorting data based on a key specified in the query; and grouping data with adjacent data if the adjacent data has a same key value for the key specified in the query.

9. The method of claim 1, wherein:

the sort plus operation is a "distinct" operation; and the step of executing the second version of the sort plus operation includes the steps of sorting data based on a key specified in the query; and returning one key value for every series of consecutive data that has the same key value for the key specified in the query.

10. A computer readable medium having stored thereon sequences of instructions for a sort plus operation, said sequences of instructions including instructions which, when executed by a processor, cause the processor to perform the steps of:

A. determining a first execution path, where execution of the first execution path would require performing the steps of:

(1) obtaining data specified in the query from a sorted source, and (2) executing a first version of the sort plus operation that does not perform sorting;

B. determining a second execution path, where execution of the second execution path would require performing the steps of:

(1) obtaining data specified in the query from an unsorted source, and (2) executing a second version of the sort plus operation that does perform sorting;

C. determining a first execution cost for the first execution path and a second execution cost for the second execution path;

D. selecting a selected execution path from among a set of execution paths that includes said first execution path and said second execution path based on a comparison of said first execution cost and said second execution cost; and E. executing said selected execution path.

11. The computer-readable medium of claim 10, wherein the step of obtaining data specified in the query from a sorted source includes the step of obtaining data specified in the query from a first index.

12. The computer-readable medium of claim 11, wherein the step of determining a first execution cost for the first execution path comprises the steps of:

determining a first access cost corresponding to accessing the first index to obtain the data specified in the query;

determining a cost of executing the first version of the sort plus operation; and determining the first execution cost based on the first access cost and the cost of executing the first version of the sort plus operation.

13. A database system comprising:

a database storing a table of a data set, and a sorted version of the data set;

a database server for processing a query based on a selected execution path, the database server including a cost-based optimizer for:

A. determining a first execution path, where execution of the first execution path would require performing the steps of:

(1) obtaining data specified in the query from the sorted version of the data set, and (2) executing a first version of the sort plus operation that does not perform sorting;

B. determining a second execution path, where execution of the second execution path would require performing the steps of:

(1) obtaining data specified in the query from the data set, and (2) executing a second version of the sort plus operation that does perform sorting;

C. determining a first execution cost for the first execution path and a second execution cost for the second execution path; and D. selecting said selected execution path from among a set of execution paths that includes said first execution path and said second execution path based on a comparison of said first execution cost and said second execution cost.

14. The system of claim 13, wherein the sorted version stored in the database is an index.

* * * * *